US012292745B2

(12) United States Patent
O'Regan et al.

(10) Patent No.: US 12,292,745 B2
(45) Date of Patent: *May 6, 2025

(54) SYSTEMS AND METHODS FOR IMPOSING PHYSICAL ACTIONS, BY ENDPOINTS, BASED ON ACTIVITIES BY USERS

(71) Applicant: MASTERCARD INTERNATIONAL INCORPORATED, Purchase, NY (US)

(72) Inventors: Simon O'Regan, Cobh (IE); Femi Odunuga, Peekskill, NY (US); Thomas Veraart, Manhasset, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,508

(22) Filed: Jun. 6, 2023

(65) Prior Publication Data
US 2023/0315125 A1 Oct. 5, 2023

Related U.S. Application Data

(63) Continuation of application No. 16/868,266, filed on May 6, 2020, now Pat. No. 11,709,505.

(51) Int. Cl.
G05D 1/00 (2024.01)
A01C 14/00 (2006.01)
(Continued)

(52) U.S. Cl.
CPC ............. *G05D 1/101* (2013.01); *A01C 14/00* (2013.01); *G01C 21/00* (2013.01); *G05D 1/0094* (2013.01);
(Continued)

(58) Field of Classification Search
CPC ...... G05D 1/101; G05D 1/0094; A01C 14/00; G01C 21/00; G06Q 20/401; B64U 2101/40; B64U 2101/60
See application file for complete search history.

(56) References Cited

U.S. PATENT DOCUMENTS

| 10,262,289 B2 * | 4/2019 | Vaananen ............. G06Q 20/10 |
| 2012/0054000 A1 * | 3/2012 | Boppert ............. G06Q 30/0207 705/14.1 |

(Continued)

OTHER PUBLICATIONS

U.S. Appl. No. 16/868,266, filed May 6, 2020.
U.S. Appl. No. 16/868,266, filed May 6, 2020, O'Regan et al.

*Primary Examiner* — Kito R Robinson
*Assistant Examiner* — Roy Rhee
(74) *Attorney, Agent, or Firm* — Harness, Dickey & Pierce, P.L.C.

(57) ABSTRACT

Systems and methods are provided for imposing physical actions, by endpoints, based on activities by users. One such method includes storing multiple rules in a data structure, where each of the multiple rules indicates a physical action to be performed in response to an activity, and then receiving, by a computing device, an activity message including data indicative of an activity of a user. The method also includes retrieving, by the computing device, one of the multiple rules from the data structure based on the data indicative of the activity and identifying, by the computing device, the physical action included in the one of the multiple rules. The method then includes transmitting, by the computing device, an order for the identified physical action to an endpoint, whereby the endpoint commands a drone to perform the identified physical action as a response to the activity of the user.

19 Claims, 3 Drawing Sheets

(51) Int. Cl.
    *G01C 21/00*     (2006.01)
    *G06Q 20/40*     (2012.01)
    *B64U 101/40*     (2023.01)
    *B64U 101/60*     (2023.01)

(52) U.S. Cl.
    CPC ....... *G06Q 20/401* (2013.01); *B64U 2101/40* (2023.01); *B64U 2101/60* (2023.01)

(56) References Cited

U.S. PATENT DOCUMENTS

| | | | |
|---|---|---|---|
| 2017/0178174 A1 | 6/2017 | Mitchell | |
| 2019/0021236 A1* | 1/2019 | Patrick | B64D 1/08 |
| 2019/0224576 A1* | 7/2019 | Cheng | A63F 13/35 |
| 2021/0349475 A1 | 11/2021 | O'Regan et al. | |

* cited by examiner

SYSTEMS AND METHODS FOR IMPOSING PHYSICAL ACTIONS, BY ENDPOINTS, BASED ON ACTIVITIES BY USERS

CROSS-REFERENCE TO RELATED APPLICATION

This application is a continuation of U.S. patent application Ser. No. 16/868,266 filed on May 6, 2020. The entire disclosure of the above application is incorporated herein by reference.

FIELD

The present disclosure generally relates to systems and methods for imposing physical actions, by endpoints, based on activities by users and, more particularly, to systems and methods for imposing such physical actions, for example, via drones, etc., associated with the endpoints based on the activities as undertaken by the users.

BACKGROUND

This section provides background information related to the present disclosure and which is not necessarily prior art.

It is common for users to purchase products from merchants through use of various payment techniques, including payment accounts (e.g., via credit cards associated with the payment accounts, etc.). In connection therewith, it is also known for issuers of the payment accounts to offer rewards to the users for use of the payment accounts to purchase the products (such that the purchases are funded by the payment accounts), whereby the users earn rewards for the purchases (e.g., miles, points, cash, etc.). Likewise, it is common for the merchants to offer incentives to users for their loyalty to the merchants in purchasing the products from the merchants, where the incentives may be in the form of points, etc. The users are then able to redeem the rewards or incentives for products or services, or payment account balance reductions, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
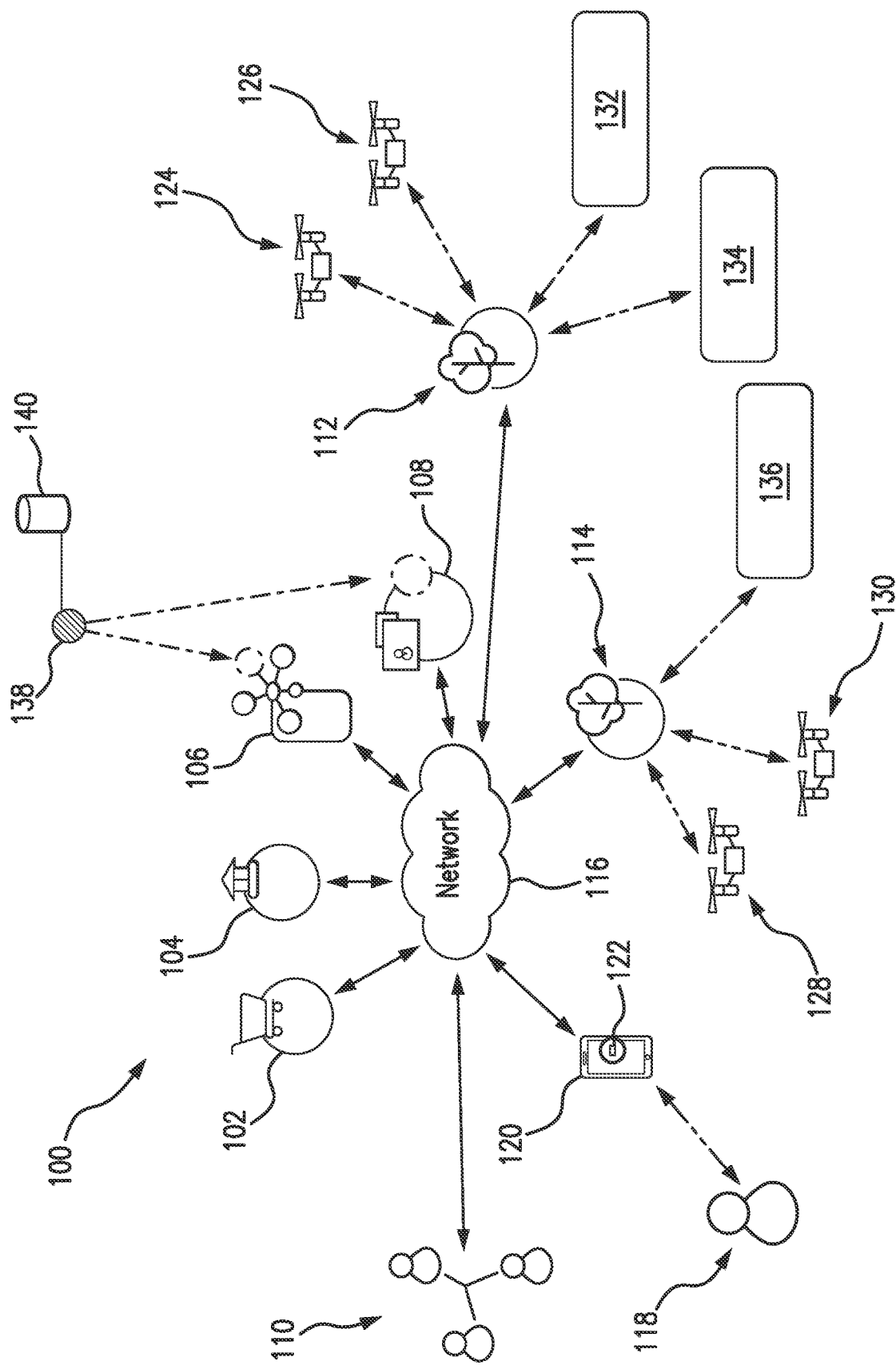
FIG. 1 illustrates an exemplary system of the present disclosure suitable for use in imposing physical actions, through endpoints, based on activities identified to rules in data structures.

Exemplary embodiments will now be described more fully with reference to the accompanying drawings. The description and specific examples included herein are intended for purposes of illustration only and are not intended to limit the scope of the present disclosure.

Merchants and issuers provide rewards to users to incentivize certain activities by the users, whereby the users, upon performing the certain activates, are awarded points, miles, dollars, etc. (broadly, rewards). The users are then able to redeem the rewards, as defined by the merchants and issuers. Redemption of the rewards, though, is generally disassociated with the activities that earn the rewards, whereby the users have no immediate feedback (or other incentives) when engaging in the certain activities. Consequently, the rewards offered by the merchants and/or issuers may not have sufficient impact on the users, in general, to justify costs associated with the rewards and/or to remind the users of links between the rewards and the merchants and/or issuers. That said, the activities incentivized by the merchants and issuers may relate to purchases, as above, or they may extend beyond to non-purchase activities, such as, for example, in application (i.e., "in-app") activities associated with the issuers or merchants, social network activities, etc. In such later cases, the non-purchase activities are again disassociated with the rewards from the issuers or merchants, and from any other online or card-based activities performed by the users (also referred to as behaviors), etc.

Uniquely, the systems and methods herein permit desired behaviors (e.g., online, card-based, or app-based activities, etc.) to be linked to sustainability actions (e.g., in the physical world, etc.), which may be automated and immediately realized by users (e.g., in real-time or near real-time, etc.). In particular, a platform is configured to receive an activity message, indicative of an activity of a user, whereby the platform determines if a rule associated with a physical action (as defined by a sponsor) is implicated by the user's activity. If so, the platform submits an order to an endpoint (e.g., a planting provider, etc.) to perform the physical action, for example, through one or more devices (e.g., drones, etc.). For instance, where the devices are drones, the drones may automate a physical action (e.g., planting of seeds, trees, etc.), whereby the physical action is performed timely, with respect to when the activity was performed by the user. And, a notification is provided to the user, from the endpoint or the platform, when the physical action is complete. In this way, the real-time or near real-time notification of the user aids the user to experience the reward (i.e., the physical action) within minutes or hours of performing the activity, i.e., in a more timely manner than can be experienced with conventional rewards. With that said, the sponsor may be directly associated with the physical action, and the effect of the physical action (e.g., sustainability when the physical action is planting trees or a cleanup effort, etc.). As such, the reward described herein is more prompt and effective for the sponsor, and is thus potentially linked to habit forming in the users, as compared to conventional rewards associated with purchases or loyalty registration or application downloading, etc. (where the ultimate rewards are then not realized until later activities by the user, etc.).

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, a number of entities involved; a relationship between merchants, issuers, planters, online providers, etc. and interactions therebetween; privacy regulations and/or rules; etc.

As shown in FIG. 1, the system 100 generally includes a merchant 102, an acquirer 104 associated with the merchant 102, a payment network 106, an issuer 108 of an account of a user 118, an online provider 110, and two endpoints 112, 114, each of which is coupled to (and is in communication with) network 116. The network 116 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 116 may include multiple different networks, such as a private payment transaction network made accessible by the payment network 106 to the acquirer 104 and the issuer 108 and, separately, the public Internet, which may provide interconnection between the merchant 102, the payment network 106, and other parts of the system 100.

The merchant 102 may include any different kind of merchant, which is configured to offer products (e.g., goods, services, etc.) for sale to users. The merchant 102 may offer products for sale through a physical location (e.g., a brick-and-mortar store, etc.) or a virtual location (e.g., a website, an application, etc.). The merchant 102 may desire to provide a physical action, such as, for example, a sustainability action for the environment (e.g., plant a tree, deliver clean water, monitor wildlife or an ecosystem, etc.), etc., to users in exchange for certain activities of the user. In connection therewith, the merchant 102 is associated with an account issued by the acquirer 104, from which the merchant 102 may fund the physical actions for the users, as described more below, in response to the users performing the certain activities.

The acquirer 104 is a financial institution configured to issue accounts to merchants, in general, including the account for the merchant 102, through which the merchants receive funds directed to the merchants via payment account transactions by users (e.g., in response to transactions by the users to purchase products from the merchants, etc.). Likewise, the issuer 108 is configured to issue accounts to users, in general, including the account for the user 118, where the accounts may include payment accounts (e.g., credit accounts, debit accounts, etc.). Moreover, like the merchant 102, the issuer 108 may desire to provide a physical action, such as, for example, a sustainability action for the environment, etc., to users in exchange for certain activities of the user 118 (i.e., the issuer's customers). In connection therewith, the issuer 108 is associated with a financial account, from which the issuer 108 may fund the physical actions for users, as described more below, in response to the users performing the certain activities.

The payment network 106 is configured to coordinate (e.g., transaction messages, etc.) between the acquirer 104 and the issuer 108 to transfer funds associated with a payment account transaction, for example, by the user 118, at the merchant 102 (e.g., authorization, clearing and settlement, etc.).

With continued reference to FIG. 1, the user 118 is associated with a mobile device 120, which may include, for example, a smartphone, a tablet, a laptop, etc. As shown, the mobile device 120 includes a network-based application 122, which configures the mobile device 120 to perform certain operations (as described herein). In this exemplary embodiment, the network-based application 122 is provided by the merchant 102, and configures the mobile device 120 to permit the user 118 to make purchases at the merchant 102 (e.g., in-app purchases, etc.), etc. While the network-based application 122 is associated with the merchant 102 in this example, it should be appreciated that the network-based application 122 may be associated with a different entity in other system embodiments (e.g., the issuer 108 (e.g., to check a balance, pay bills, view transaction data, etc.)).

The online provider 110 is configured to interact with the user 118, via the mobile device 120 or other computing device, etc. The online provider 110 may include, without limitation, a social network (e.g., Facebook™, Twitter™, Google+™, Flickr™, Instagram™ TokenedIn™, Myspace™, Pinterest™, etc.), etc., whereby the user 118 is permitted to post content and interact with other users, etc. through the online provider 110. For example, the user 118 may post a message containing a hashtag, etc., to his/her board or profile, or to someone else's board or profile, etc., at the online provider 110 (broadly, an activity by the user 118). In another example, the online provider 110 may include a gaming, online role-play, or virtual adventure/environment provider (e.g., Second Life™ or Minecraft™ games, etc.), which are provided for entertainment, and may involve users interacting with the provider or, potentially, other users, through the provider, etc. In this example, the user's interactions may define accomplishments, victories, survival, or other activities, through the provider (again, all broadly activities by the user 118). In either case, and more particularly, in general, the online provider 110 is configured to deliver activity data, for the user 118 and/or other users in response to such activities by the user(s) at or through the online provider 110, via, for example, an application programing interface (API), or otherwise.

The two endpoints 112, 114 of the system 100 are configured to perform one or more physical actions, as a manner of rewarding the users for performing the certain activities described herein. In this exemplary embodiment, the two endpoints 112, 114 are planting providers, which are configured to plant trees (broadly, as part of reforestation, etc.), for example, in one or more spaces, as directed. Other endpoints may be configured to deliver other actions including, for example, activities relating to water conservation, water provisioning (e.g., delivery of potable water, etc.), food provisioning, disaster relief (e.g., in response to tornados, hurricanes, earthquakes, pandemics, etc.), cleanup (e.g., maritime cleanup, etc.), monitoring ecosystems (e.g., forests, marine, rainforest, wildlife reserve or sanctuaries, etc.), etc.

The endpoint 112 is associated with (as indicated by the dotted arrow) two drones 124, 126, each of which is configured to receive a command to perform a particular physical action, to perform the physical action, and to transmit a verification of the physical action as complete, etc. In this exemplary embodiment, for example, the drone 124 (and/or the drone 126) is loaded with tree seedpods and, upon receiving the command, is configured to takeoff and fly to a designated planting space and to "shoot" one or more of the tree seedpods into the planting spaces, whereby the tree is planted. Similarly, the endpoint 114 is associated with drones 128, 130. And, the drones 128, 130 are consistent with the drones 124, 126, as described above. It should be appreciated that the inclusion of the drones 124-130 in the system 100 provides for automation of the physical action (e.g., thereby providing speed, scale, efficiency, and limited cost, etc. in connection with effecting the physical action; etc.). The drone 124, for example, may be configured to plant up to about 100,000 tree seedpods per day (e.g., at an average of about 2,000 tree seedpods per hectare, etc.), which may be substantially faster, more efficient, and/or potentially cheaper than a human planter.

With that said, it should be appreciated, that other devices, other than drones, may be employed in other system embodiments to similarly plant tree seedpods. In addition, it should be appreciated that other devices at other endpoints may be employed to perform other actions within the scope of the present disclosure.

With further reference to FIG. 1, the endpoint 112 is associated with (as indicated by the dotted, arrowed lines) spaces 132, 134, and the endpoint 114 is associated with a space 136. The spaces 132-136 may include any different region, such as, for example, a plot of land, a designated wildlife area, an area without running water, village, etc. In addition, the spaces 132-136 may be defined by borders (e.g., city, state, territory, country, etc.), postal codes, defined boundaries, etc. It should be appreciated that spaces associated with a single endpoint (e.g., like spaces 132, 134, etc.) will often be in disparate locations, etc. For example, the space 132 may be in North America, while the space 134 may be in South America. In this exemplary embodiment, the endpoints 112, 114 are planting providers, whereby the spaces 132-136 are each planting plots, etc. Further, in this exemplary embodiment, the drone 124 is assigned by the endpoint 112 to plant in the space 132 (and not the space 134), and the drone 126 is assigned by the endpoint 112 to the space 134 (and not the space 132), whereby the spaces 132, 134 may be spread apart in different regions, states, countries, etc. Conversely, the drones 128, 130 are both assigned, by the endpoint 114, to the space 136, whereby the drones 128, 120 may both rapidly respond to commands to plant in the space 136.

It should be appreciated that any combination of spaces, in any location, and drones, in any combination or number, may be employed in other system embodiments, to effectively perform the physical actions associated with the particular endpoints of the system embodiments (e.g., sufficient to provide real-time or near real-time physical action (from the user activity), etc.).

While one merchant 102, one acquirer 104, one payment network 106, one issuer 108, one online provider 110, two endpoints 112, 114, four drones 124-130, and three spaces 132-136 are illustrated in FIG. 1, it should be appreciated that any number of these entities (and their associated components) may be included in the system 100, or may be included as parts of systems, in other embodiments, consistent with the present disclosure. Likewise, it should be appreciated that a different number of users and mobile devices may be included in the system 100, or as parts of systems in other embodiments, whereby only one user 118 and one mobile device 120 are shown in FIG. 1 for simplicity.

Figure 2:
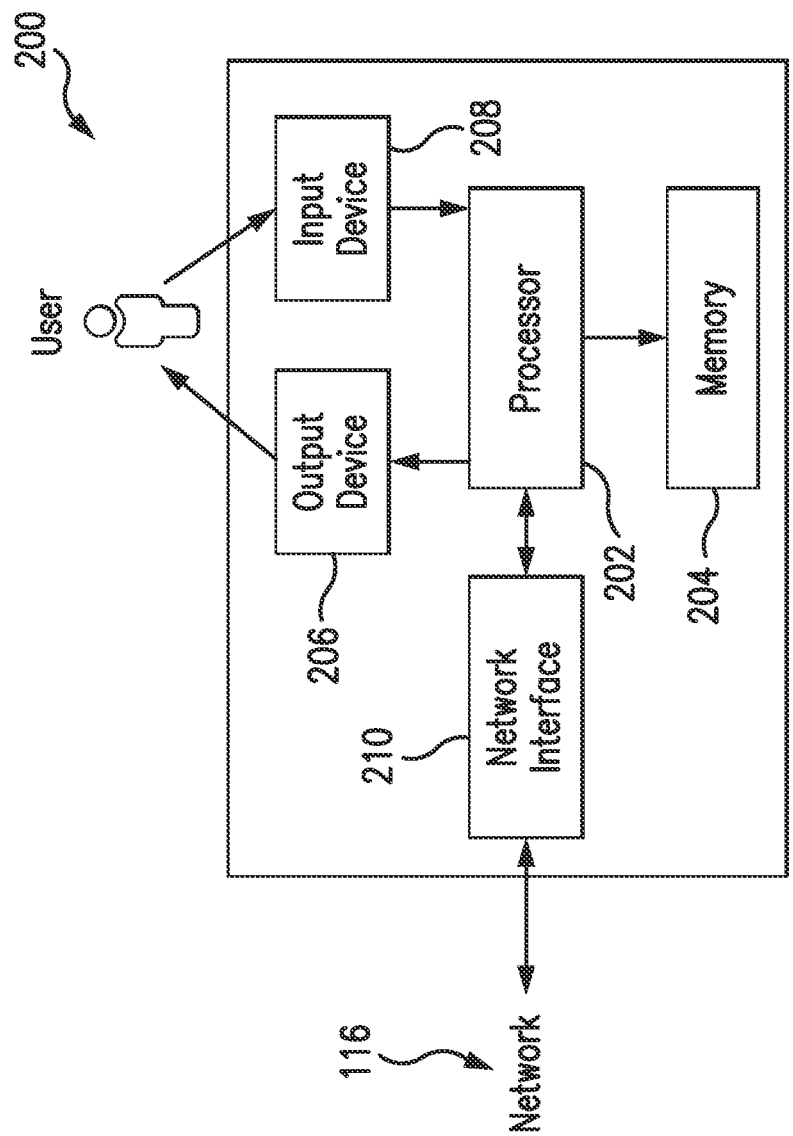
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, virtual devices, etc. In addition, the computing device 200 may include a single computing device, or it may include multiple computing devices located in close proximity or distributed over a geographic region, so long as the computing devices are configured to function as described herein. In the exemplary embodiment of FIG. 1, each of the merchant 102, the acquirer 104, the payment network 106, the issuer 108, the online provider 110, and the endpoints 112, 114 may be understood as being embodied, or being implemented, in one or more computing devices consistent with the computing device 200, and coupled to the network 116. In addition, the mobile device 120 may be considered a computing device consistent with the computing device 200. However, the system 100 should not be considered to be limited to the computing device 200, as described below, as different computing devices and/or arrangements of computing devices may be used.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the operations described herein.

The memory 204, as described herein, is one or more devices that permit data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. With that said, the memory 204 may be configured to store, without limitation, transaction data, user profiles, merchant profiles, issuer profiles, other profiles, commands, verifications, specified activities, specified actions, links therebetween, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., in method 300, etc.), such that the memory 204 is a physical, tangible, and non-transitory computer readable storage media. Such instructions often improve the efficiencies and/or performance of the processor 202 that is performing one or more of the various operations herein, whereby in connection with performing the operations the computing device 200 may be transformed into a special purpose computing device. It should be appreciated that the memory 204 may include a variety of different memories, each implemented in connection with one or more of the functions or processes described herein.

In the exemplary embodiment, the computing device 200 also includes an output device 206 that is coupled to (and that is in communication with) the processor 202 (however, it should be appreciated that the computing device 200 could include output devices other than the output device 206, etc.). The output device 206 outputs data, such as, for example, verification notifications, commands to endpoints, etc., visually or otherwise, to a user of the computing device 200, such as user 118, endpoint 112, 114, etc. It should be appreciated that various interfaces (e.g., as defined by network-based applications (including websites) such as application 122, etc.) (broadly, network-based interfaces) may be displayed at computing device 200, and in particular at output device 206, to display such information. With that said, the output device 206 may include, without limitation, a presentation unit comprising a liquid crystal display (LCD), a light-emitting diode (LED) display, an organic LED (OLED) display, an "electronic ink" display, one or more speakers, etc. In some embodiments, the output device 206 may include multiple devices.

In addition, the computing device 200 includes an input device 208 that receives inputs from the user (i.e., user inputs) such as, for example, inputs to initiate payment account transactions (e.g., at the application 122 or otherwise at the merchant 102, etc.), social network postings, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 116. Further, in some exemplary embodiments, the computing device 200 may include the processor 202 and one or more network interfaces incorporated into or with the processor 202.

Referring again to FIG. 1, the system 100 further includes a platform 138 and a data structure 140 in communication therewith. The platform 138 and the data structure 140 may each be considered computing devices consistent with the computing device 200. In connection therewith, the platform 138 includes executable instructions (e.g., stored in memory 204, etc.), which configure the platform 138 (e.g., as a computing device or as multiple computing devices, etc.) to operate as described herein. The platform 138 is generally in communication with the payment network 106 and/or the issuer 108 (e.g., via network 116 or otherwise, etc.). With that said, it should be appreciated that the platform 138 may be integrated in whole or in part with the payment network 106 and/or the issuer 108, as indicated by the dotted lines. The data structure 140, in turn, is coupled to and/or is in communication with the platform 138. While the data structure 140 is illustrated as separate from the platform 138 (as a separate device, for example), it should be appreciated that the data structure 140 may be incorporated with the platform 138, for example, in memory 204 therein, etc., in one or more embodiments. And, when the platform 138 is incorporated into the payment network 106 and/or the issuer 108 (or otherwise), the data structure 140 may likewise be incorporated therewith.

In this exemplary embodiment, the system 100 generally is configured to effect a physical action, as a service provided by the merchant 102, the payment network 106, the issuer 108, the online provider 110, and/or the endpoints 112, 114, in response to certain activities performed by uses (including the user 118).

In connection therewith, when the physical action is associated with the merchant 102, the platform 138 is configured to interact with the merchant 102, for example, to register the merchant 102 for the service, from which a profile for the merchant 102 is compiled and stored in the data structure 140. As part of the registration, the merchant 102 is configured to identify a payment account, by which the service is funded, and also one or more rules related to implementing the service. The one or more rules each include an event (or user activity) and a physical action based on the event. For example, the merchant 102 may decide to plant one tree (as the physical action) for each in-app purchase (via the application 122) (as the event or user activity), or to plant two trees for every $50 spent with the merchant 102, or to plant a tree for each round-up transaction donation at the merchant 102. Other rules may be based on storing a payment account credential in the application 122 (e.g., provisioning a payment token, etc.), putting a card-on-file with the merchant 102, signing up for or using a loyalty or rewards account at the merchant 102, downloading, installing and/or registering the application 122 (or using a new feature thereof), exceeding a transaction amount (per transaction or for aggregate transactions), exceeding a number or count of transactions, specific products or purchases (e.g., transit purchases, such as flights, fuel, a specific product (e.g., as indicated by UPC data, etc.) etc.), use of certain transportation (e.g., by miles travelled (e.g., by a car, etc.), etc.), etc. In short, the rules may be defined for any behavior or activity taken between the user 118 and the merchant 102, as desired by the merchant 102 (as a sponsor of the rule), or otherwise.

As noted above, in registering the merchant 102 to the platform 138 for the service, the platform 138 is configured to identify a payment account for the merchant 102, by which the merchant 102 funds the physical actions. In doing so, the platform 138 is configured to solicit the payment account (and/or credentials for the payment account) and the rules from the merchant 102, and to then store the received data (payment account data, rules, etc.) in the data structure 140.

In addition, the platform 138 is configured to instruct the merchant 102 on reporting activities associated with the rules. For example, where the platform 138 is integrated, at least in part, with the payment network 106, the platform 138 is configured to instruct the merchant 102 to transmit activity (or reporting) messages along the payment rails, for example, via an interface processor (e.g., a Mastercard® interface processor or MIP, etc.). The message may be consistent with an ISO 8583 standard, and may include a specific value in one or more data elements (or sub elements) of the message to signal to the payment network 106 the nature of the message, whereby the payment network 106 is configured to forward the message to the platform 138. The merchant 102, then, in response to the activities (or events) defined in the merchant's rules, is configured to transmit an activity message to the payment network 106 along the payment rails of the payment network 106. That said, it should be appreciated that the platform 138 may be configured to receive activity messages via other channels. For example, the platform 138 may be configured to expose an application programming interface (API), whereby the merchant 102 may be configured to call the API to report an activity to the platform 138.

What's more, when the activities included in the rules relate to a payment account transaction, the acquirer 104 and/or the issuer 108 may be configured to identify the activity. Further, in some embodiments, the user 118 may be allowed to specify the physical action (or aspects of the physical action) associated with the activity. For instance, the user 118 may be allowed to specify a type of tree to be planted or a location for the tree to be planted (based on options provided by the sponsor of the action, etc.). Broadly, it should be understood that the user 118 may be permitted to personalize certain rules (and, potentially, certain activities related thereto) associated with the user 118 as related to specific incentives or targets (broadly, certain actions), etc.

Furthermore, the platform 138 may be configured to interact with the issuer 108, for example, to register the issuer 108 for the service, whereby a profile for the issuer 108 and/or the user 118 is compiled and stored in the data structure 140. As part of the registration, the issuer 108 is configured to identify a payment account for the issuer 108 by which physical actions associated with the service are to be funded, along with one or more rules for linking user activities to the physical actions. As above, the rules each include an event (or user activity) and a physical action based on the event. For example, the issuer 108 may decide to plant one tree for every $50 spent by the user 118 with the payment account issued by the issuer 108, or to plant a tree for each round-up transaction donation via the payment account, etc. Other rules may be based on storing a payment account credential in the application 122 (e.g., provisioning a payment token, etc.), downloading, installing and/or registering an application related to the issuer 108, exceeding a transaction amount (per transaction or for aggregate transactions), exceeding a number of transactions, specific purchases (e.g., transit purchases such as flights, fuel, etc.). In short, again, the rules set by the issuer 108 may be defined for any behavior or activity between the user 118 and the issuer 108, as desired by the issuer 108 (where the issuer is the sponsor of the rule), or otherwise.

And, like with the merchant 102, in registering the issuer 108 to the platform 138 for the service, the platform 138 is configured to identify a payment account for the issuer 108, by which the issuer 108 funds the physical actions. In doing so, the platform 138 is configured to solicit the payment account (and/or credentials for the payment account) and the rules from the issuer 108, and to then store the received data (payment account data, rules, etc.) in the data structure 140. What's more, the issuer 108 is also configured to transmit activity messages to the payment network 106 and/or the platform 138, as activities implicated by the rules are performed by the user 118, via the payment rails, APIs, or otherwise, etc.

While the merchant 102 and the issuer 108 are referenced specifically above, it should be appreciated that other parties may participate in defining rules, and more broadly, in sponsoring a physical action based on the user's activities, etc. Specifically, as to system 100, the payment network 106 may be configured to interact with the platform 138 to register, as above, and to define certain rules, by which physical actions are to be performed based on activities of or associated with the user 118 (and other users). For example, the payment network 106 may sponsor a delivery of food or water to a location based on a user's purchase, with a payment network affiliated payment account, being with a specific merchant or category of merchant (e.g., a charity, etc.), being of a certain amount, etc. In addition, a government, or government agency, may also participate in defining rules, and more broadly, sponsoring physical actions based on the user's activities with regard to (or related to) the government agency (e.g., timely paying taxes, etc.), etc.

What's more, the user 118, or a user associated with the user 118, (e.g., a parent, guardian, sibling, other relative, employer, etc.) may participate in defining rules, and more broadly, sponsoring physical actions based on the activities of the user 118, etc. For example, the user 118 may decide to sponsor a cleanup effort for an oil spill in a local region, based on certain purchases effected by the user 118, or omitted purchases, or based on a roundup of certain or all purchases, via the payment account issued by the issuer 108. The user 118, in such embodiments, may configure the mobile device 120, via the application 122, for example, to submit activity messages to the platform 138 (whereby the mobile device 120 or the application 122 may be considered a source of such messages), or the user 118 may link the rule to the payment account issued by the issuer 108, whereby the issuer 108 provides the activities message to the platform 138 (or the platform 138 is permitted to retrieve transaction data or activity messages from the issuer 108), etc.

The merchant 102 and the issuer 108 (or other parties), in defining rules, may further rely on activities directed to other entities in defining the rules. Specifically, for example, the online provider 110 may track content related to the user 118, such as posts, likes, views, etc., and other users. The online provider 110 may be configured to either report specific content to the platform 138 or to respond to a request for content from the platform 138. The content may be associated with and/or desired by the merchant 102 (or the issuer 108), whereby the merchant 102 may provide one or more rules related to the content from the online provider 110. For example, the merchant 102 may define a rule whereby two trees are planted for every hashtag posted by the user 118, at the online provider 110, which is related to the merchant 102 (e.g., #sercvie@merchant102isgreat, or #issuer108isecofriendly, etc.) and whereby one tree is planted for every like or repost of the hashtag by another user associated with the user 118, and/or whereby five trees are planted for every image posted by the user 118 at the online provider 110 (e.g., of the user 118, etc.) and whereby two trees are planted for every like or repost of the image, etc. It should be appreciated that such rules associated with the online provider 110 may be specific to the user 118, who has a prior relationship with the merchant 102, or general, such that content is implicated by the rules regardless of any relationship with the merchant 102.

What's more, the platform 138 may also be configured, in some embodiments, to receive and/or to retrieve data related to one or more activities of the user 118 (or other users) from other devices, potentially, devices associated with the activities or the user 118 or the merchant 102, or the issuer 108, or the online provider 110, etc. For example, the platform 138 may be configured to capture mileage from a vehicle (not shown) associated with the user 118, for example, via an ODB-II connector or device included in the vehicle whereby the platform 138 is able to determine a mileage of the vehicle as it may relate to one or more rules, etc. Likewise, the platform 138 may be configured to receive or retrieve a message, from the mobile device 120, which is indicative of an activity of the user 118 (based on a use of the mobile device 120 in a particular manner), and which is related to one or more rules.

Similarly, each of the endpoints 112, 114 is registered with the platform 138, whereby the platform 138 is configured to compile a profile for the endpoints 112, 114 and to store the profiles in the data structure 140. The profile for the endpoint 112, for example, includes a location of the spaces 132, 134, an active planting season for the spaces 132, 134 (e.g., when trees may be planted, etc.), a capacity of the spaces 132, 134, and options for planting of different types of trees, prices, estimated times to plant, etc. The profile further includes one or more account numbers for payment (by the sponsor), upon completion of the commanded planting. The profile of the endpoint 114 (stored in the data structure 140) is similar.

With that said, in operation of the system 100, when a registered activity is performed by the user 118, an activity message is compiled by the merchant 102, the acquirer 104, the issuer 108 or the online provider 110 (e.g., as a sponsor of a corresponding physical action linked to the activity, etc.), etc., and transmitted to the platform 138 (directly, or via the payment network 106). The activity message includes various data, such as, for example, a description of the activity performed by the user 118 and at least one identifier of the user 118 (e.g., contact information (e.g., an email address, username, phone number, etc.), a payment account number for the user 118 and/or for the sponsor, etc.), and, potentially, a rule or entity (e.g., the merchant 102, the issuer 108, etc.) associated with and/or sponsoring the service (or action) for the activity, a physical action to be performed in general (e.g., plant a tree, etc.) or in detail (e.g., plant an oak tree in Wyoming, etc.), etc.

In turn, in response to the activity message, the platform 138 is configured to access the data structure 140 and to retrieve the one or more rules implicated by the message, as understood from the contact information, the payment account number and/or the identified rule or entity, etc. in the message. The platform 138 is configured to apply the rule to the activity description included in the activity message and to identify a physical action. For example, where the user 118 has performed a specific transaction at the merchant 102 (e.g., a transaction of a certain amount, a purchase of a specific type, etc.), the rule may define planting of five trees for the transaction. As such, the platform 138 is configured to identify the action as the planting of five trees, as donated by the merchant 102 on behalf of the user 118.

The platform 138 may be configured to then immediately (or almost immediately (e.g. less than one minute, etc.)) forward a command for the five trees, or to wait for a limited interval (e.g., one minute, five minutes, ten minutes, thirty minutes, etc.) in order to aggregate the five trees with another five, ten, 100 trees to be planted based on messages for other transactions implicated by the same or different rules, received from the merchant 102, the issuer 108, other entities, etc. Additionally, or alternatively, the platform 138 may be configured to wait until a defined number of trees is to be planted in general before commanding the planting action to the endpoints 112, 114 (e.g., 100, 500, 1000, etc.).

Whether immediately, or after the limited interval or defined number of actions, the platform 138 is configured to identify an endpoint suitable for the command to plant the trees. In this exemplary embodiment, the platform 138 is configured to retrieve the profiles for the endpoints 112, 114 and to determine which endpoint is consistent with the planting action. Each of the profiles may include, without limitation, a description of the capacity of the endpoint, which includes spaces of the endpoint, locations of the spaces, active planting seasons, available physical actions, available trees for planting, etc. For example, the space 136 may not be in an active planting season (not presently or not including a current time), while space 134 is in an active planting season (presently or including a current time), whereby the platform 138 is configured to select the endpoint 112. When both endpoints 112, 114 have suitable space, and trees, the platform 138 may be configured to alternate between the endpoints 112, 114, or decide between the endpoint on further bases (e.g., cost, etc.).

Once the endpoint 112, for example, is identified, the platform 138 is configured to transmit a planting order or command (broadly, an order for the physical action) to the endpoint 112. The planting order includes a description of the trees to be planted, a number of the trees, etc. In turn, the endpoint 112 is configured to review the planting order and to issue a command to the drone 126, for example, to plant the prescribed trees. The drone 126 is configured to receive the command, to takeoff from a staging area of the endpoint 112, to fly to the space 134, for example, and to shoot a number of tree seedpods (consistent with the order) into the space 134. The drone 126 is further configured to issue a planting verification once the seedpods have been planted at the space 134 to the endpoint 112, and also to fly back to a staging area of the endpoint 112 and to land. It should be appreciated that the endpoint 112 and the drone 126 act to perform (or carry out) the physical action immediately upon receipt of the order, thereby in real-time or near real-time form the activity of the user 118. Real-time may include within a couple minutes up to about fifteen minutes, while near real-time may include above about fifteen minutes up to about a few hours, or up to twelve hours, etc.

In response to the planting verification, the endpoint 112 is configured to transmit a notification to the user 118, based on the user's activity, indicating the planting of the trees has been completed. The endpoint 114 may be configured to push the notification directly to the user 118, at the mobile device 120, via the application 122 or via a short message service (SMS) message or other electronic message to the mobile device (based on information included in the order), etc., or to transmit the notification to the platform 138, whereby the platform 138 is configured to push the notification directly to the user 118, at the mobile device 120, via the application 122 or a short message service (SMS) message or other electronic message to the mobile device (based on information included in the activity message or included in data structure 140 for the satisfied rule), etc. It should be appreciated that, overall, the user 118, then, is notified immediately, or within real-time or near real-time of, or after, the activity by the user 118 occurred that triggered or caused the physical action. Real-time may include within a couple minutes up to about fifteen minutes, while near real-time may include above about fifteen minutes up to about a few hours. In this manner, the reward or the physical action is more closely linked to performance of the activity by the user 118, whereby the user 118 is more likely to appreciate the merchant 102 (or other sponsor) and understand the cause-and-effect relationship between the activity and the reward or physical action.

Apart from the user 118, it should be appreciated that the endpoint 112 is also configured to notify other users associated with any other trees to be planted that were aggregated with the trees to be planted for the user 118, for example, based on the limited interval or defined number of trees. Further, the endpoint 112 is configured to notify the platform 138 and/or the payment network 106 that the trees have been planted consistent with the order associated with the merchant 102, issuer 108, etc. (broadly, the sponsor). Also, while the above description is directed to the endpoint 112, the space 134 and the drone 126, it should be understood to apply, similarly, to the other endpoint 114, other spaces 132, 136 and other drones 124, 128, and 130 included in the system 100.

Thereafter, the platform 138, or the payment network 106, is configured, in response to a completion notice from the endpoint 112, for example, to initiate a push transaction from the sponsor of the rule (e.g., the merchant 102, the issuer 108, etc.) to the account of the endpoint 112. The platform 138, or the payment network 106, is configured to populate the details of the transaction from the profile associated with the sponsor and the endpoint 112, including, without limitations, charges, account numbers, etc. The transaction is thereafter completed, whereby funds are debited from the sponsor's account and deposited into the endpoint's account. As a result, the endpoint 112 performed the physical action and the user 118 was notified of the physical action, while the merchant 102, for example, paid for the physical action as a manner of persuading the user 118 to engage in the activity, for example, specified by the merchant 102, etc.

Figure 3:
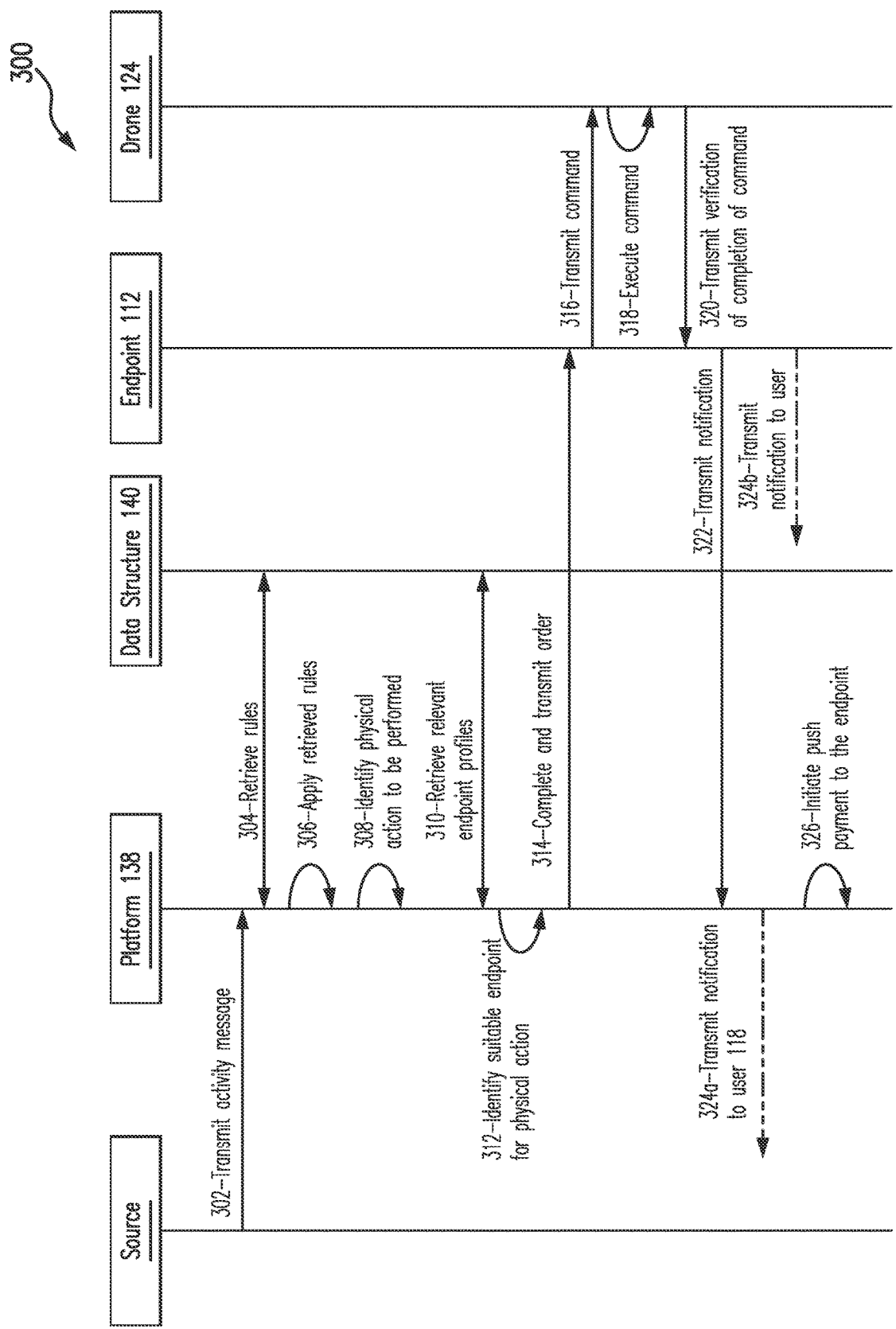
FIG. 3 is an exemplary method, which may be implemented in connection with the system of FIG. 1, for imposing a physical action, through an endpoint, based on an activity trigger of a rule for the physical action.

FIG. 3 illustrates an exemplary method 300 for imposing a physical action, through an endpoint, based on an activity trigger of a rule for the physical action. The exemplary method 300 is described as implemented in the platform 138 and the endpoint 112 of the system 100, and other parts of the system 100, and with further with reference to computing device 200. However, it should be understood that the method 300 is not limited to the system 100, as the method 300 may be implemented in other system embodiments. Similarly, it should be appreciated that the system 100 herein is not limited to the method 300.

It should also be understood, in the method 300, that the merchant 102, the issuer 108, and the online provider 110 are each registered to the platform 138, as is the endpoint 112. In this manner, the data structure 140, coupled to the platform 138, includes profiles for each, whereby rules are stored to indicate performance of a physical action, by the endpoint 112, in this example, based on activities of the user 118 (and other users). What's more, the "source" illustrated in FIG. 3 may include, without limitation, the merchant 102, the issuer 108 or the online provider 110, as each may be the source of a message indicating an activity of the user 118 triggering a physical action (e.g., an action associated with a rule, etc.). In connection therewith, the source may also be the sponsor of a rule associated with an activity, or the source may be different from the sponsor.

At the outset in method 300, the source transmits an activity message to the platform 138, at 302. The activity message may be transmitted to the platform 138 in various manners. Specifically, for example, the activity message may include a payment message (e.g., as part of a payment account transaction by the user 118, etc.) consistent with the ISO 8583 standard or other suitable payment standard, to the platform 138, via the payment network 106. In connection therewith, the activity message may include, without limitation, an 0100 message (received at an interface processor of the payment network 106), in which a defined data element includes a particular code (e.g., 01, etc.) indicative of a physical action services message, while other data elements, or sub elements, include a description of the user's activity (e.g., a transaction amount, a product description, a download of an application, a payment application, etc.), an identifier of the user 118 (e.g., contact information, etc.), an identifier of the source (e.g., the merchant 102, the issuer 108, etc.), a description of the physical action (e.g., tree planting, oak tree planting in Utah, food delivery, cleanup action, etc.), etc. That said, it should be appreciated that the activity message may be an authorization message (e.g., a request or a reply, etc.) for a transaction involving the user 118 that constitutes the activity, or the activity message may include a separate message specific to the activity and/or the physical action service to the platform 138, via the payment network 106 (e.g., via a direct service access or DSA, etc.), etc. In any case, the payment network 106, upon recognizing the activity message as relating to the platform 138 (or the physical action service), provides the activity message to the platform 138.

In another example, the activity message may include an API call, from the online provider 110, which includes, again, a description of the message, identifiers, etc. In this example, the activity message is based on content associated with the user 118 at the online provider 110 (e.g., posts, likes, reposts, etc.). In still other examples, the merchant 102 and the issuer 108 may transmit activity messages, via an API or other suitable manner, to the platform 138 (directly or via the payment network 106).

Upon receipt of the activity message from the source, the platform 138 accesses the data structure 140 and retrieves, at 304, one or more rules associated with the activity message. The platform 138 may retrieve all rules associated with the identifier of the merchant 102 (or the issuer 108) included in the activity message (broadly, the source), or all rules associated with the identifier of the user 118 included in the message, etc. Or, the platform 138 may retrieve all rules associated with a type of the activity and the identifier of the issuer 108 (or merchant 102) included in the activity message, etc.

The platform then applies, at 306, the one or more rules, retrieved from the data structure 140, to the activity message. And, based on the application of the one or more rules, identifies, at 308, the physical action to be performed.

For example, when the activity message includes a roundup transaction donation and identifiers for the user 118 and the issuer 108 (e.g., as the source, etc.), the platform 138 retrieves one or more rules related to roundup transaction donations and the issuer 108. One of the rules may be specific to a range of payment accounts, of which the payment account of the user 118 used in the transaction is within the range of payment accounts. As such, the platform 138 identifies that specific rule, which includes planting of five tree seedpods for each roundup transaction donation. The platform 138 then applies the rule to the transaction, and identifies the physical action as five trees to be planted. In another example, the activity message may include a description of an in-application transaction by the user 118 (e.g., from the application 122, etc.) and identifiers for the merchant 102 and the user 118 (e.g., an application ID for the application 122, etc.). The platform 138 retrieves the relevant rules, one of which is a rule sponsored by the merchant 102, which provides for three tree seedpods to be planted for each in-application transaction under $25.00 and for five tree seedpods to be planted for each in-application transaction equal to or above $25.00. In turn, the platform 138 applies the rule and identifies that three tree seedpods are to be planted because the in-application transaction was for $13.25, as the transaction amount included in the activity message.

In still another example, the activity message may indicate use of a specific hashtag associated with the merchant 102 in a post by the user 118, on a social network of the online provider 110 (whereby the online provider 110 may be the source of the activity message). The activity message includes identifiers of the merchant 102, as a sponsor of the rule, and the user 118. In response, the platform 138 retrieves one or more rules, from the data structure 140, associated with the online provider 110, the user 118 and/or the merchant 102. The platform 138 applies the retrieved one or more rules, where one of the rules, which provides for planting one tree seedpod for each use of the hash tag, is applicable. As such, the platform 138 identifies one tree seedpod to be planted.

Optionally, after a physical action is identified, the platform 138 may impose one or more limits to executing the physical actions. Specifically, when one or five trees are to be planted from one activity message, and multiple activity messages are received in a given hour, or few hours, etc., the platform 138 may aggregate the identified physical actions over a limited interval (e.g., two minutes, five minutes, thirty minutes, sixty minutes, etc.) or until a defined number of physical actions (e.g., 10, 100, 1000, etc.) are identified. It should be appreciated that the limited interval and/or the defined number may vary depending on, for example, a type of physical action, etc. The platform 138 may therefore wait until the limited interval or the defined number is satisfied, and then, the platform 138 may proceed. In this manner, the platform 138 may be more efficient in ordering the physical actions, and which may then be consistent with environmentally conscious actions.

Then in the method, once the physical action is identified (and, as appropriate, the time limit of defined number is satisfied), the platform 138 retrieves, at 310, relevant endpoint profiles from the data structure 140 and, therefrom, identifies a suitable endpoint for the physical action, at 312. As described above, the physical action may include planting trees, delivering clean water or food, monitoring a specific ecosystem or area, etc. Different endpoints will have different capabilities to perform the physical actions, or not. For example, an endpoint located in a dessert region may be equipped to deliver, via drone, water to local people, but would not be equipped to plant trees in that region. As such, the platform 138 identifies the endpoint(s) that are equipped and/or capable of performing the physical action. In the above example, the platform 138 identifies the physical action as planting trees, whereby the platform 138 searches in the endpoint profiles in the data structure 140 for endpoints capable of planting trees. In FIG. 1, for example, both the endpoints 112, 114 are capable of planting trees. The platform then further identifies, from the available endpoints 112, 114, which one has an active planting time for a space, an available space, sufficient tree seedpods, desired types of tree seedpods, an acceptable cost, an acceptable location (e.g., based on a user preference, etc.), etc. In this example, the spaces 132, 136 are both within active planting times and both endpoints 112, 114 have Douglas fir seedpods (which is part of the physical action). The platform 138 further notes, in the data structure 140, that a prior physical action was assigned to the endpoint 114, which may be relevant to relying on the multiple endpoints 112, 114. As such, the platform 138 identifies the endpoint 112, as the endpoint to perform the physical action.

It should be appreciated that a variety of factors and techniques (e.g., artificial intelligence, machine learning, etc.) may be relied upon in identifying one endpoint over another for performing the physical action or actions identified by the platform 138.

With continued reference to FIG. 3, the platform 138 then compiles and transmits, at 314, an order for the physical action to the endpoint 112, i.e., the identified endpoint. The order includes a description of the physical action (e.g., plant 25 Douglas fir trees, etc.) and either an identifier of the order (e.g., an order number, etc.) or, generally, an identifier of the user 118 (whose activity is the cause of the physical action).

In response to the order, the endpoint 112 identifies the appropriate drone, such as, for example, the drone 124, which is associated with the active planting space 132, and is loaded with Douglas fir tree seedpods, and transmits a command, at 316, to the drone 124. The drone 124 in turn executes the command, at 318. In doing so, the drone 124 takes off from a staging area associated with the space 132, for example, flies to the space 132, and shoots 25 of the "Douglas fir tree seedpods" into the space 132. Once complete, the drone 124 transmits, at 320, a verification of the completion of the command/order (e.g., including a description of the planting (e.g., 25 seedpods planted at specific lat./long., etc.), etc.). The drone 124 then flies back to the staging area, and awaits a next command.

In the meantime, the endpoint 112 receives the verification from the drone 124 and transmits, at 322, a notification to the platform 138 that the order has been fulfilled. The notification may (e.g., a first notification, etc.) include, for example, an order number included in the original order, or other indicia linking the notification to the order from the platform 138.

What's more the user 118 is notified of the planting (broadly, of the physical action). For instance, the platform 138 may optionally (as indicated by the dotted line) transmit, at 324a, a notification (e.g., a second notification, etc.) to the user 118 (e.g., a push message, etc.), based on an identifier included in the original activity message or retrieved from the data structure 140 (e.g., based on a phone number, email address, application ID of the application 122 or other application, etc.). Additionally, or alternatively, the endpoint 112 may optionally (as indicated by the dotted line) transmit, at 324b, the notification to the user 118, based on an identifier included in the order (e.g., a push notification based on an application ID of the application 122, or the email address or phone number of the user 118 (or mobile device 120), etc.), etc. Regardless of whether the notification is transmitted by the platform 138 or the endpoint 112, in this example, the user 118 is notified within minutes (e.g., 15 minutes, 30 minutes, 40 minutes, etc.) or an hour or a few hours of the activity, which initiated the physical action to be performed. The notification may indicate, for example, "25 trees have been planted in Region as a reward for your in-application purchase!," "5 gallons of drinking water have been delivered to the people of Region for your payment account spending exceeding $100. Thank you!," etc. The notification may be specific to the activity and the physical action, or not.

Finally in the method 300, the platform 138, directly or via the payment network 106, initiates a push payment to the endpoint 112, at 326. In particular, the data structure 140 includes account numbers, etc., for the endpoint 112, as the performer of the physical action, and the merchant 102, for example, as a sponsor of the rule giving rise to the action. As such, the platform 138 initiates a push transaction, whereby funds are pushed from the account of the merchant 102 to the account of the endpoint 112, as payment for the physical action. The transaction is further cleared and settled by the payment network 106.

In view of the above, the systems and method herein provide for physical action incentives to be performed in real-time or near real-time after an activity triggering the physical action. As such, a sponsor may define a rule, which links the activity to the physical action, whereby a user, who performs the activity or causes the activity (as may or may not be beneficial or desirable to the sponsor), is promptly notified of the performance of the physical action, in response to the activity. The prompt notification creates a link, for the user, between not only the activity and the physical action, but also the sponsor of the rule. As such, the systems and methods herein provide for enhanced linking between the sponsor and the physical action, in connection with rewarding users for performing certain activities, which may include sustainability actions (e.g., tree planting, food/water delivery, conservation actions, cleanup efforts, etc.), whereby the sponsor may be beneficially associated with such sustainability to the user.

Again and as previously described, it should be appreciated that the functions described herein, in some embodiments, may be described in computer executable instructions stored on a non-transitory computer-readable storage media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of: (a) receiving, by a computing device, an activity message including data indicative of an activity of a user; (b) retrieving, by the computing device, at least on rule from a data structure based on the data indicative of the activity, the at least one rule including a physical action for said activity of the user; (c) identifying, by the computing device, the physical action from the at least one rule; (d) transmitting, by the computing device, an order for the physical action to an endpoint, whereby the endpoint commands a drone to perform the physical action; (e) receiving a notification of completion of the physical action from the endpoint; (f) transmitting a notification to the user indicating completion of the physical action, in response to the notification of completion from the endpoint, in real-time or near real-time; (g) retrieving an account number for an account of the endpoint from a profile specific to the endpoint; (h) retrieving an account number for an account of the sponsor from the profile specific to a sponsor of the at least one rule; (i) initiating a transaction between the account of the endpoint and the account of the sponsor, based on the retrieved account numbers, to push funds from the account of the sponsor to the account of the endpoint to pay for the physical action; (j) storing the at least one rule in the data structure based on an input from a sponsor of the at least one rule, the sponsor including a merchant associated with the activity; and (k) identifying the endpoint based on the identified physical action, prior to transmitting the order to the endpoint.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for imposing a physical action based on an activity, the method comprising:
    storing multiple rules in a data structure, each of the multiple rules indicating a physical action to be performed in response to an activity;
    receiving, by a computing device, an activity message including data indicative of an activity of a user;
    retrieving, by the computing device, one of the multiple rules from the data structure based on the data indicative of the activity;
    identifying, by the computing device, the physical action included in the one of the multiple rules, wherein the identified physical action is a sustainability action including one of: planting a tree or a seedpod, delivering potable water, or monitoring an ecosystem;
    identifying an endpoint to perform the identified physical action based on the endpoint being consistent with the identified physical action and also having capacity to perform the identified physical action; and
    transmitting, by the computing device, an order for the identified physical action to said endpoint, whereby the endpoint commands a drone to perform the identified physical action in response to the activity message indicative of the activity of the user.

2. The computer-implemented method of claim 1, wherein the activity message further includes an identifier associated with a sponsor of the one of the multiple rules; and wherein retrieving the one of the multiple rules includes retrieving the one of the multiple rules, from among the multiple rules, further based on the identifier associated with the sponsor.

3. The computer-implemented method of claim 1, further comprising:

receiving a notification of completion of the physical action from the endpoint; and transmitting a notification to the user indicating completion of the physical action, in response to the notification of completion from the endpoint, in real-time or near real-time relative to the activity of the user.

4. The computer-implemented method of claim 1, wherein the data structure further includes a profile associated with the endpoint and a profile specific to a sponsor of the one of the multiple rules; and wherein the method further comprises:

retrieving an account number for an account of the endpoint from the profile specific to the endpoint;

retrieving an account number for an account of the sponsor from the profile specific to the sponsor; and initiating a transaction between the account of the endpoint and the account of the sponsor, based on the retrieved account numbers, to push funds from the account of the sponsor to the account of the endpoint to pay for the physical action.

5. The computer-implemented method of claim 1, wherein retrieving the one of the multiple rules includes searching in the data structure for the one of the multiple rules, further based on an identifier associated with one of a sponsor of the one of the multiple rules and the user.

6. The computer-implemented method of claim 5, wherein the sponsor includes an issuer of a payment account associated with the user; and wherein the activity is associated with the payment account.

7. The computer-implemented method of claim 1, further comprising storing the one of the multiple rules in the data structure based on an input from a sponsor of the one of the multiple rules, the sponsor including a merchant associated with the activity.

8. The computer-implemented method of claim 1, further comprising identifying the endpoint prior to transmitting the order to the endpoint.

9. The computer-implemented method of claim 8, wherein the physical action includes planting the tree or the seedpod; and wherein the capacity of the endpoint includes the endpoint being within an active planting season including a current time.

10. The computer-implemented method of claim 1, wherein the endpoint includes a provider having multiple drones including said drone; and wherein the physical action includes delivering potable water by said drone of the multiple drones.

11. The computer-implemented method of claim 1, wherein the activity includes one of: storing a payment account credential in an application or on-file with a merchant; signing up for a loyalty or rewards account; downloading, installing and/or registering an application; initiating a transaction to a payment account which exceeds a transaction amount; initiating a transaction to a payment account which exceeds a transaction count; and/or initiating a transaction to a payment account for a specific product.

12. A system for imposing a physical action based on an activity by a user, the system comprising:

a computing device including a memory and a processor coupled to the memory;

wherein the memory includes a data structure having multiple rules, each rule associated with a sponsor and indicating a physical action to be performed in response to an activity; and wherein the processor is configured to:

receive an activity message including data indicative of an activity of a user and an identifier of a sponsor;

in response to the activity message:

retrieve at least one of the multiple rules from the data structure based on the data indicative of the activity and/or the identifier of the sponsor;

identify the physical action included in the at least one of the multiple rules, wherein the identified physical action is a sustainability action including one of: planting a tree or a seedpod, delivering potable water, or monitoring an ecosystem;

identify an endpoint to perform the identified physical action based on an endpoint profile of the endpoint being consistent with the identified physical action and the endpoint having capacity to perform the identified physical action;

transmit an order for the identified physical action to the identified endpoint, whereby the identified endpoint commands a drone to perform the identified physical action in response to the activity message indicative of the activity of the user;

receive a first notification of completion of the physical action from the endpoint; and transmit a second notification to the user indicating completion of the physical action, in response to the first notification of completion from the endpoint, in real-time or near real-time of the activity of the user.

13. The system of claim 12, wherein the processor is further configured, in response to receiving the first notification of completion of the physical action from the endpoint, to initiate a push transaction from an account of the sponsor of the at least one of the multiple rules to an account of the endpoint.

14. The system of claim 12, further comprising the endpoint and the drone associated with the endpoint;

wherein the endpoint is configured to transmit a command, based on the order, to the drone;

wherein the drone is configured to receive the command from said endpoint, execute the command thereby performing the identified physical action, and transmit a verification of completion of the command to the endpoint; and wherein the endpoint is further configured to transmit the first notification of completion of the physical action to the computing device in response to the verification of completion of the command.

15. A non-transitory computer-readable storage medium comprising computer-executable instructions, which when executed by at least one processor in connection with imposing a physical action based on an activity by a user, cause the at least one processor to:

receive an activity message including data indicative of an activity of a user and an identifier associated with a sponsor;

retrieve at least one rule from a data structure based on the data indicative of the activity and/or the identifier associated with the sponsor included in the activity message, the at least one rule including a physical action for said activity of the user, the at least one rule specific to said sponsor;

identify the physical action from the at least one rule, wherein the identified physical action is a sustainability action including one of: planting a tree or a seedpod, delivering potable water, or monitoring an ecosystem;

identify an endpoint to perform the identified physical action based on the endpoint being consistent with the identified physical action and having capacity to perform the identified physical action;

transmit an order for the identified physical action to said endpoint, whereby the endpoint commands a drone to perform the identified physical action in response to the activity message indicative of the activity of the user;

receive a first notification of completion of the physical action from an endpoint; and in response to the first notification of completion from the endpoint, transmit a second notification to the user in real-time or near real-time as defined from the activity of the user, the second notification indicating completion of the physical action.

16. The non-transitory computer-readable storage medium of claim 15, wherein the executable instructions, when executed by the at least one processor, further cause the at least one processor to:

retrieve, from the data structure, a profile associated with said endpoint in the data structure; and identify said endpoint from multiple endpoints based on the profile of said endpoint indicating whether the endpoint is configured consistent with the identified physical action and whether the endpoint has the capacity to perform the identified physical action.

17. The non-transitory computer-readable storage medium of claim 16, wherein the executable instructions, when executed by the at least one processor, further cause the at least one processor to:

retrieve a profile for the sponsor from the data structure, the profile for the sponsor including an account number for an account of the sponsor; and in response to the first notification, initiate a transaction from the account of the sponsor, based on the account number, to an account associated with the endpoint.

18. The non-transitory computer-readable storage medium of claim 17, wherein the physical action includes planting the tree or the seedpod; and wherein the sponsor includes one of a merchant and an issuer of a payment account to the user.

19. The non-transitory computer-readable storage medium of claim 15, wherein the physical action includes delivering potable water.

* * * * *